(12) United States Patent
Kiffer et al.

(10) Patent No.: US 10,994,238 B2
(45) Date of Patent: May 4, 2021

(54) RADIAL FLOW ADSORPTION VESSEL COMPRISING FLEXIBLE SCREEN

(71) Applicant: Air Products and Chemicals, Inc., Allentown, PA (US)

(72) Inventors: Micah S. Kiffer, Kutztown, PA (US); Christopher Michael O'Neill, Allentown, PA (US); Stephen Clyde Tentarelli, Schnecksville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 217 days.

(21) Appl. No.: 16/124,712

(22) Filed: Sep. 7, 2018

(65) Prior Publication Data

US 2020/0078722 A1   Mar. 12, 2020

(51) Int. Cl.
*B01D 53/04* (2006.01)
*B01J 8/00* (2006.01)

(52) U.S. Cl.
CPC .......... *B01D 53/0431* (2013.01); *B01J 8/008* (2013.01); *B01D 53/0423* (2013.01); *B01D 2253/102* (2013.01); *B01D 2253/104* (2013.01); *B01D 2253/108* (2013.01); *B01D 2253/1124* (2013.01); *B01D 2253/204* (2013.01); *B01J 2208/00672* (2013.01); *B01J 2208/00884* (2013.01); *B01J 2219/185* (2013.01); *B01J 2219/1943* (2013.01)

(58) Field of Classification Search
CPC ................ B01D 53/04; B01D 53/0423; B01D 53/0431; B01D 2253/102; B01D 2253/104; B01D 2253/108; B01D 2253/1124; B01D 2253/204; B01D 2259/4146; B01J 8/008; B01J 8/0214; B01J 8/0411; B01J 2208/000672; B01J 2208/00884; B01J 2219/185; B01J 2219/1943
USPC ............................................ 96/121, 131, 132
See application file for complete search history.

(56) References Cited

U.S. PATENT DOCUMENTS

| | | | | |
|---|---|---|---|---|
| 2,046,458 A * | 7/1936 | Johnson | ................ | B01D 29/111 166/231 |
| 3,222,140 A * | 12/1965 | Fletcher | ................ | F01N 3/2053 422/115 |
| 4,244,922 A * | 1/1981 | Burke | .................... | B01J 8/0214 208/146 |
| 4,276,265 A * | 6/1981 | Gillespie | .................... | B01J 8/44 210/497.01 |
| 4,541,851 A * | 9/1985 | Bosquain | ............. | B01D 53/261 96/126 |
| 5,169,528 A * | 12/1992 | Karbachsch | ......... | B01D 24/008 210/264 |

(Continued)

FOREIGN PATENT DOCUMENTS

| KR | 101550532 B1 | 9/2015 |
|---|---|---|
| RU | 2514950 C1 | 5/2014 |

*Primary Examiner* — Frank M Lawrence, Jr.
(74) *Attorney, Agent, or Firm* — Matthew R. Weaver (57) ABSTRACT

The present invention pertains to a radial flow adsorption vessel comprising a cylindrical outer shell and at least one cylindrical porous wall disposed co-axially inside the shell, wherein inside the shell one or more fluid permeable screens are rigidly connected to the at least one cylindrical porous wall, by a multitude of separate standoff elements so that the screen has a cylindrical shape co-axial to the shell, and to an adsorption process using the radial flow adsorption vessel.

20 Claims, 8 Drawing Sheets

(56) References Cited

U.S. PATENT DOCUMENTS

| | | | |
|---|---|---|---|
| 5,827,485 A | 10/1998 | Libal et al. | |
| 5,964,259 A | 10/1999 | Ackley et al. | |
| 6,086,659 A | 7/2000 | Tentarelli et al. | |
| 6,221,320 B1* | 4/2001 | Nagaoka | B01J 8/0207 422/218 |
| 6,770,120 B2 | 8/2004 | Neu et al. | |
| 7,311,763 B2 | 12/2007 | Neary et al. | |
| 7,829,038 B2 | 11/2010 | Vetter et al. | |
| 7,906,081 B2 | 3/2011 | Naunheimer et al. | |
| 8,101,133 B2 | 1/2012 | Ackley et al. | |
| 8,216,343 B2 | 7/2012 | Ackley et al. | |
| 2006/0236867 A1* | 10/2006 | Neary | B01D 53/0415 96/121 |
| 2008/0107575 A1* | 5/2008 | Vetter | B01J 8/0278 422/211 |
| 2008/0145288 A1* | 6/2008 | Koves | B01J 8/0214 422/310 |
| 2012/0079938 A1* | 4/2012 | Celik | B01D 53/0462 95/95 |

* cited by examiner

RADIAL FLOW ADSORPTION VESSEL COMPRISING FLEXIBLE SCREEN

FIELD

The present invention relates to a radial flow adsorption vessel comprising a cylindrical outer shell and at least one cylindrical porous wall disposed co-axially inside the shell, and one or more fluid permeable screens which are rigidly connected to the at least one cylindrical porous wall, and to an adsorption process using the vessel.

BACKGROUND

Purification of gases by adsorption often requires the removal of multiple impurities from a gas stream. While this can sometimes be done using a single adsorbent layer, it is often more economical to use at least two different adsorbents to optimize the adsorption process. In conventional axial flow vessels, this is easily achievable by loading particulate materials sequentially to create distinct layers perpendicular to the fluid flow path. However, radial flow adsorption vessels require annular segments for the distinct layers to be perpendicular to the fluid flow path which are usually created by cylindrical barriers disposed within the vessel.

Typically, radial flow adsorption vessels comprise an outer shell and porous walls, such as an inner and outer porous wall, which are formed of a perforated plate usually made out of metal for rigidity and strength with a fine wire mesh overlay to retain the adsorbent particles between the porous walls. These porous walls create the annular segment(s) wherein particles can be loaded. When designing a vessel with more than one annular adsorbent layer, further walls are required to enable each adsorbent layer to be loaded and retained separately. Such further walls are typically constructed in a manner similar to the inner and outer porous walls using a perforated (metal) plate to achieve shape stability overlayed with a fine wire mesh, and are affixed to either the top head of the vessel and/or to a bottom support plate.

U.S. Pat. No. 6,086,659 discloses a radial flow adsorption vessel, method of vessel assembly, and a method of manufacture for containment screens with bidirectional flexibility. The radial flow adsorption vessel includes a cylindrical shell and a plurality of cylindrical porous walls disposed concentrically inside the shell. The pores/openings in the supporting plates are designed to provide flexibility in both the axial and radial direction.

U.S. Pat. No. 6,770,120 discloses a vessel and a radial adsorption bed within the vessel and an inner adsorption bed or storage tank within the inner diameter of the radial adsorption bed. The inner adsorption bed is either an axial adsorption bed or an inner radial adsorption bed. U.S. Pat. No. 6,770,120 uses porous walls to define the adsorption beds.

U.S. Pat. No. 7,829,038 discloses a radial flow reactor which includes a plurality of supports affixed to the housing, i.e. the outer shell of the reactor, and a plurality of screens where each screen is affixed to a pair of neighbouring supports. Between the reactor shell, screens and supports fluid flow channels, are arrayed circumferentially around the inside of the reactor housing.

A first problem arising from the need to include porous walls into radial adsorption flow vessels and their usual construction is the increase in overall cost of the vessel. In addition, these walls increase the pressure drop through the particulate bed and reduce the adsorbent utilization due to the shadowing effect of the non-perforated area. Still further, the perforated plates made out of a rigid and non-flexible material such as metal are usually brought into cylindrical form by rolling and welding flat sheets of perforated plates. Many small sheets are often required in order to form a complete cylinder due to limitation of the perforating equipment. Dimensional tolerances of the individual sheets and weld distortion that occurs during fabrication cause imperfections in the finished cylinders. Cylinders can be out-of-round, out-of-straight and peaked at weld seams. When two cylinders with such defects are nested inside one another, large differences in the width of the annulus between them can result. These defects create non-uniform adsorbent layer depths along the fluid flow path within the radial vessel which causes early breakthrough of a contaminant and degrades the performance and efficiency of the separation process.

Finally, in radial flow adsorption vessels having several porous walls to create multiple annular segments for different adsorbents, maintenance problems are created, as e.g. repairs to the outermost porous wall are difficult because the intermediate wall(s) must be cut apart and re-welded in the field.

SUMMARY

The present invention aims at providing a radial flow adsorption vessel which allows for solving or at least alleviating the above mentioned problems, and in which annular segments for filling with adsorbent particles are created so that adsorbent layers are formed which reliably retain their shape and have, as far as possible, uniform depths in fluid flow direction.

The invention is based on the finding that the shape stability of one or more porous walls commonly comprising perforated rigid plates of a radial flow adsorption vessel can be used to provide the necessary strength and shape stability to one or more flexible screens which are affixed to said one or more porous walls by a multitude of standoff elements, thus forming part of the boundary of (an) annular segment(s) in which adsorbent particles are to be filled and retained.

The invention therefore provides a radial flow adsorption vessel comprising a cylindrical outer shell and at least one cylindrical porous wall disposed co-axially inside the shell, wherein inside the shell one or more fluid permeable screens are rigidly connected to the at least one cylindrical porous wall by a multitude of separate standoff elements so that the screen has a cylindrical shape co-axial to the shell.

The standoff elements affixed to the porous wall of the vessel provide the necessary structural support for the screen to maintain its shape under the conditions of a swing adsorption process allowing a lightweight flexible material alone to be used as a screen to define annular segments and retain adsorbent particles therein. The standoff elements are separate from each other which means that they are not connected to each other. They can be affixed at each end to the screen and porous wall independently by weld, adhesive, bolts, or any other fastener method familiar and apparent to one skilled in the art.

Furthermore, the screen connected to a porous wall by a multitude of separate standoff elements allows for a compensation of dimensional deviations of porous walls disposed within the shell from ideal cylindrical shape and/or a compensation of deviations from co-axiality of porous walls by adapting the length of individual standoff elements, so that annular segments having uniform width, i.e. uniform thickness of the particulate adsorbent layer in direction of the fluid flow, can be obtained. Thus, when such an annular segment is filled with adsorbent particles, early breakthrough of contaminants through this layer is prevented and performance of the adsorption process is maintained.

Finally, the design and fixation of the screen in the present invention allows for its easy removal and replacement in the field so that maintenance of the adsorption vessel is facilitated, e.g. by facilitating access to the outermost porous wall of the vessel.

The screen in the radial flow adsorption vessel of the invention has a cylindrical shape which means that it is closed along its whole circumference and axial extension. The screen may be made out of several individual parts which do not extend over the whole circumference. The individual parts are then connected to each other to form a complete cylindrical screen. For example, individual parts may overlap to form the cylindrical screen. The individual parts may or may not be joined to one another.

The openings of the material forming the screen are usually selected so that adsorbent particles loaded into an annular segment which, at least in part, is defined by the screen, cannot pass through it.

Preferably, the screen comprises, more preferably consists of, a mesh wire, woven wire cloth or an expanded metal. These materials, which are also commonly used as an overlay for perforated plates to form porous walls, are especially well suited to be used as a screen in the present invention due to being lightweight and having openings small enough to retain the adsorbent particles.

The screen usually comprises, more preferably consists of, a material having an open area of up to 45%. In preferred embodiments the open area may be equal to or smaller than 30%.

Further preferred, the screen comprises, or consists of, a material in which the thickness of the ligaments t between the openings is small compared to the particle diameter d of the adsorbent. Preferably, the thickness t is equal to or smaller than 0.9 d, more preferably t is equal to or smaller than 0.75 d. The particle diameter d is defined as the equivalent diameter of a sphere that has the same volume of the particle, defined by the equation $$d = 2 * \left(\frac{3*V}{4*pi}\right)^{\frac{1}{3}}$$

where V is the volume of a particle and d is the equivalent spherical diameter of the given particle.

Usually, the screen comprises, or consists of, a material having a stiffness of less than 35 Nm, more preferably of less than 10 Nm.

As described above, the radial flow adsorption vessel comprises at least one cylindrical porous wall which is disposed co-axially inside the shell, and the fluid permeable screen is rigidly connected to the porous wall by the multitude of separate standoff elements.

Such porous walls commonly comprise perforated (metal) plates with a stiffness high enough to maintain shape stability under conditions of swing adsorption processes without the need for further support. For this reason, these plates are also denoted as "structural" plates. Usually, the perforated plates have a stiffness of 500 to 5,000 Nm. A stiffness within this range may e.g. be obtained using a a perforated steel plate having a thickness of 6 mm.

The openings in perforated plates are usually so big that adsorbent particles may pass through them. Therefore, common porous walls in addition to a perforated plate use materials as used, for example, for the screen in the present invention as an overlay of the perforated plates.

Thus, the porous walls disposed in the vessel of the invention preferably comprise, more preferably consist of, a perforated plate and an overlay of a material used as a screen in any of the embodiments as described above.

In a further embodiment of the invention, the radial flow adsorption vessel comprises at least an inner cylindrical porous wall disposed co-axially inside the shell and an outer cylindrical porous wall disposed co-axially inside the shell and the fluid permeable screen is rigidly connected to one of the porous walls by the multitude of separate standoff elements.

By "inner" cylindrical porous wall a porous wall is meant which has a smaller diameter than the "outer" porous wall.

In still a further embodiment of the invention, in the radial flow adsorption vessel a second fluid permeable screen is rigidly connected to the first fluid permeable screen by a second multitude of separate standoff elements so that the second screen has a cylindrical shape co-axial to the shell by affixing the first end of each of the second standoff elements to a standoff element of the first multitude of standoff elements which rigidly connect the first screen to a porous wall. The standoff elements can be affixed at each end to the screen, porous wall and/or to other standoff elements independently by weld, adhesive, bolts, or any other fastener method familiar and apparent to one skilled in the art.

The standoff elements used in the radial flow adsorption vessel according to the invention generally comprise a first end, a second end and a leg connecting the first and second end. The length of standoff element is defined to be the extension from the outer face of its first end to the outer face of its second end, which usually corresponds to the total extension of the element in radial direction when mounted. The height and the width of the element are the extensions in the directions perpendicular to the length and perpendicular to each other.

Usually, designated annular segments of the radial flow adsorption vessel are filled with adsorbent particles from the top of the vessel by using gravity. In order to impair the filling process as little as possible, preferably, the standoff elements are mounted so that they have their smallest extension (usually denoted as their "width") in the plane perpendicular to the filling direction of the adsorbent particles. This direction usually is the direction from the top to the bottom of the vessel, in parallel to the axis of the screen.

The cross section of the connecting legs in a plane perpendicular to the axis of the legs may have rectangular shape.

The edges of the standoff elements pointing in the filling direction of the adsorbent particles may be tapered. This way, formation of voids in the adsorbent layer underneath the standoff elements can be avoided. Preferably, an angle greater than the angle of repose of the adsorbent material as measured from the horizontal, i.e. a plane perpendicular to the axis of the shell, is used for tapering. Said angle may preferably be up to 30°, more preferably greater than 45°, as measured from the horizontal, i.e. a plane perpendicular to the axis of the shell.

Furthermore, also the edges of the standoff elements pointing in the direction opposite to the filling direction of the adsorbent particles may be tapered.

The separate standoff elements are preferably disposed both in the longitudinal direction, i.e. in a direction in parallel to the axis of the screen, and in the circumferential direction of the cylinder formed by the screen. This means that both in longitudinal as well as in circumferential direction separate standoff elements are present.

The length of standoff elements may be selected so that a uniform radial distance between the screen and an adjacent screen or porous wall is obtained. In this case, the standoff elements should all have the same length.

In case a uniform radial distance between the screen and an adjacent screen or, porous wall, to which the first screen is not affixed by the means of standoff elements, is to be achieved the length of individual standoff elements can be adjusted so as to compensate imperfections in the cylindrical form or axiality of the adjacent screen or porous wall.

Preferably, the standoff elements are disposed equidistantly to each other along the longitudinal direction.

Usually, the distance between standoff elements in longitudinal direction is from 10 cm to 150 cm, more preferably is from 15 cm to 100 cm, and still more preferably is from 20 cm to 75 cm.

Usually, the standoff elements in the longitudinal direction are disposed on lines parallel to the axis of the cylinder formed by the screen.

Preferably, the standoff elements are disposed equidistantly to each other in the circumferential direction.

Usually, the distance between standoff elements in circumferential direction is from 10 cm to 150 cm, more preferably is from 15 cm to 100 cm, and still more preferably is from 20 cm to 75 cm.

Usually, the standoff elements in the circumferential direction are disposed on planes perpendicular to the axis of the cylinder formed by the screen.

The top end of the screen may or may not be connected to other elements of the vessel. It is, however, not necessary to connect the top end of the screen to other elements of the vessel in order to provide further structural support to the screen.

In an embodiment of the radial flow adsorption vessel according to the invention the outermost and innermost annular segments within the vessel form channels for fluid flow to and from the adsorbent bed.

In a further embodiment, at least one, usually all annular segments of the radial flow adsorption vessel according to the invention designated to be filled with adsorbent, which usually are all annular segments except the outer- and innermost (central) annular segments, are filled with adsorbent particles. Different types of material may be used as adsorbent such as alumina, silica, zeolites, activated carbon, metal oxide sorbents, or crystalline organic frameworks with or without metals such as metal organic frameworks (MOFs), zeolitic imidazolate frameworks (ZIFs), or covalent organic frameworks (COFs). Each layer of adsorbent particles defined by an annular segment in the radial flow adsorption vessel may comprise, or consist of, different material, or may comprise, or consist of, the same material but having different particle sizes.

Still further, a support plate may be provided at the bottom of the shell to which the bottom end(s) of porous wall(s) and the screen are rigidly connected. The support plate at bottom of the shell may at its center have an opening or a conduit in fluid connection with the innermost annular segment.

Usually, the top end and the bottom end of the shell both independently are enclosed by a head with hemispherical, torispherical, conical, flat or other geometry.

Furthermore, usually an inlet for providing adsorbent particles is provided at the top end of the vessel, so that adsorbent particles may be filled into the designated annular segments of the vessel by gravity flow.

The radial flow adsorption vessel according to the invention may be designed for U-flow, reverse U-flow or Z-flow geometry. In a U-flow geometry, the flow enters and exits from the same end of the vessel. In a Z-flow geometry, the flow enters and exits from opposite ends of the vessel. In a reverse U-flow geometry, the flow enters and exits the adsorbent bed from the same end of the vessel, but reverses direction in one of the flow passages such that the two streams exit the vessel at opposite ends.

The present invention furthermore provides an adsorption process wherein the radial flow adsorption vessel in any of the above described embodiments is used. This adsorption process may be a pressure and/or vacuum swing adsorption process.

The terms "longitudinal" and "circumferential" direction as used herein in general relate to respective directions of a cylinder defined by either the shell, a porous wall or a screen.

The "stiffness" as used herein is defined as the stiffness of the material in bending per unit width, $E*I/b$, wherein E is the elastic modulus of the material (in units $N/m^2$), b is the width of the specimen (in units of m), and I is the moment of inertia of the cross-section of a specimen of width b (in units $m^4$). For a solid sheet with a rectangular cross-section having width b and thickness t, the moment of inertia is $b*t^3/12$ and the stiffness is therefore $E*t^3/12$. For complex geometries, such as wire mesh and perforated plate, the stiffness may be measured rather than calculated. It may be measured by placing a sample of width b between two simple supports (supports with no moment-bearing capacity) spaced a distance L from one another and pushing on the center of the sample with a known force F to cause it to deflect downward a distance y at the center. The stiffness can then be calculated using the equation for deflection of a center-loaded simply supported beam, $E*I/b=F*L^3/(48*y*b)$.

The radial flow adsorption vessel of the invention or any of its parts may also be made by an additive manufacturing method.

BRIEF DESCRIPTION OF THE DRAWINGS

The present invention will hereinafter be described in conjunction with the appended figures wherein like numerals denote like elements.

DETAILED DESCRIPTION

FIGS. 1 to 10 illustrate embodiments of the radial flow adsorption vessel of this invention and selected components thereof. The cross-sectional views in FIGS. 1, and 5 to 10 depict how flexible screens are integrated into the radial flow adsorption vessel but do not include all means of attachment, conduits, piping, or other aspects of the invention that are readily understood and apparent to one skilled in the art. FIGS. 1, and 5 to 10 illustrate U-flow radial adsorption vessels with fluid entering at the bottom of the vessel, flowing radially from the outermost to the central annular segment, and exiting the central annulus through a conduit at the bottom of the vessel. The present invention is not limited to such U-flow radial vessels as vessels according to the invention can be easily designed also for other radial flow geometries (i.e. reverse U-flow, Z-flow) as apparent to one skilled in the art.

In all embodiments of the radial flow adsorption vessel as depicted in FIGS. 1 and 5 to 10 and as described in the following, vessel 1 has a first or top end 3 and a second or bottom end 5 both of which can be enclosed by a hemispherical, torispherical, conical, flat, or other head geometry. The first end 3 has at least one conduit 7 that is used as a port to introduce or remove adsorbent from the vessel. The second end 5 has two conduits 9 and 11 used for inlet and outlet flow of fluids to the radial flow vessel. The shell 13 and outer porous wall 19 define an outermost annular flow channel 15 that is in fluid communication with conduit 11 through second end 5. The inner porous wall 23 creates central annulus 17 that is in fluid communication with conduit 9.

Furthermore, in all embodiments of the radial flow adsorption vessel as depicted in FIGS. 1 and 5 to 10 and as described in the following, in general different types of material may be used as adsorbent such as alumina, silica, zeolites, activated carbon, metal oxide sorbents, or crystalline organic frameworks with or without metals such as metal organic frameworks (MOFs), zeolitic imidazolate frameworks (ZIFs), or covalent organic frameworks (COFs) which are filled in particulate form into designated annular segments. If several such segments are created in the vessel they may be filled with different adsorbents, or, as the adsorbents are in particulate form, also the same adsorbent having different particle sizes and/or shapes may be filled into different annular segments.

Figure 1:
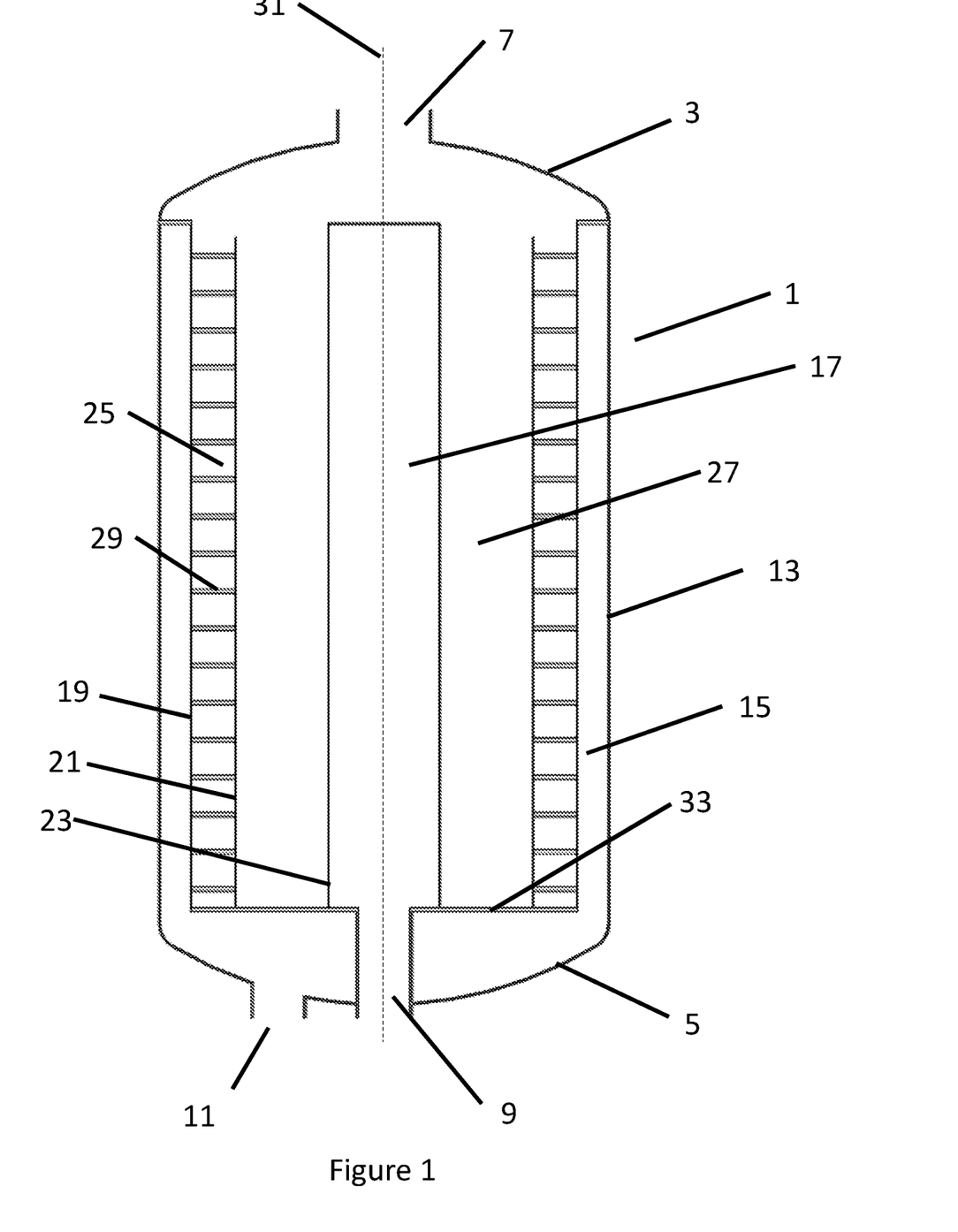
FIG. 1 shows a cross section of a first embodiment of the radial adsorption vessel according to the invention in a plane containing the axis of the cylindrical shell.

In all embodiments of the radial flow adsorption vessel as depicted in FIGS. 1 and 5 to 10 and as described in the following, the porous walls, such as the outer porous wall 19 and inner porous wall 23 shown in FIG. 1, are similar in design to containment screens found in prior art. For example, the porous walls may consist of a perforated plate with large openings for fluid flow overlaid with a mesh screen or expanded metal whose openings are smaller in size than the adsorbent particles within the annular segments.

The (intermediate) screen(s) in all embodiments of the radial flow adsorption vessel as depicted in FIGS. 1 and 5 to 10 and as described in the following is made of a flexible material such as wire mesh, woven wire cloth, or expanded metal. The flexibility of the screen material allows for the intermediate screen(s) to be shaped to match possible non-uniform contours of the porous wall(s) that are formed during the rolling process and hence to create annular segments which have uniform depths in fluid flow direction.

Finally, in all embodiments of the radial flow adsorption vessel as depicted in FIGS. 1 and 5 to 10 and as described in the following, the standoff elements can be affixed at each end to a screen/wall by weld, adhesive, bolts, or any other fastener method familiar and apparent to one skilled in the art.

Referring to FIG. 1 where a first embodiment of the radial flow adsorption vessel of the invention is described, cylindrical vessel 1 comprises a cylindrical shell 13 with three fluid permeable cylindrical barriers (19, 21, and 23) inside the shell, creating annular segments 25 and 27 that are designated to be filled with adsorbent. The fluid permeable barriers are designed as an outer porous wall 19, an inner porous wall 23 and as an intermediate screen 21. The shell, porous walls, and screen are arranged co-axially with the same axis of symmetry 31.

A plurality of standoff elements 29 are affixed at a first end to the outer porous wall 19 and at a second end to the intermediate screen 21. The plurality of standoff elements 29 provide the necessary strength and rigidity to intermediate screen 21 to maintain its cylindrical shape and retain a load of adsorbent within either annular segment 25 and/or 27 during filling with the adsorbent and during the adsorption process.

In addition, the standoff elements all have the same length when measured from the first end to the second end creating a uniform distance between outer porous wall 19 and intermediate screen 21. Hence, annular segment 25 is controlled to have a uniform depth in fluid flow direction so that, when annular segment 25 is filled with adsorbent particles, early breakthrough of contaminants through this layer due to non-uniform bed depth is prevented and performance of the adsorption process is maintained.

The intermediate screen is affixed to the vessel by a plurality of standoff elements and therefore does not need to be attached to the vessel at its upper and/or lower end. The upper end of the intermediate screen 21 may be free-standing, as shown in the figure, or may be affixed to the top of the vessel. The lower end of the intermediate screen near support plate 33 can be free or affixed to support plate 33 by a weld, adhesive, or other method.

In practice, shell 13 and porous walls such as outer 19 and inner 23 may have shape imperfections such as regarding their roundness (cylindricity), straightness, and/or co-axiality with other elements of the vessel. These originate from the fabrication process of the shell and/or the porous walls/the perforated plates which may involve rolling and connecting multiple sheets of perforated plates to complete the cylindrical structural plate of a porous wall, and from the process of assembling the vessel.

Figure 7:
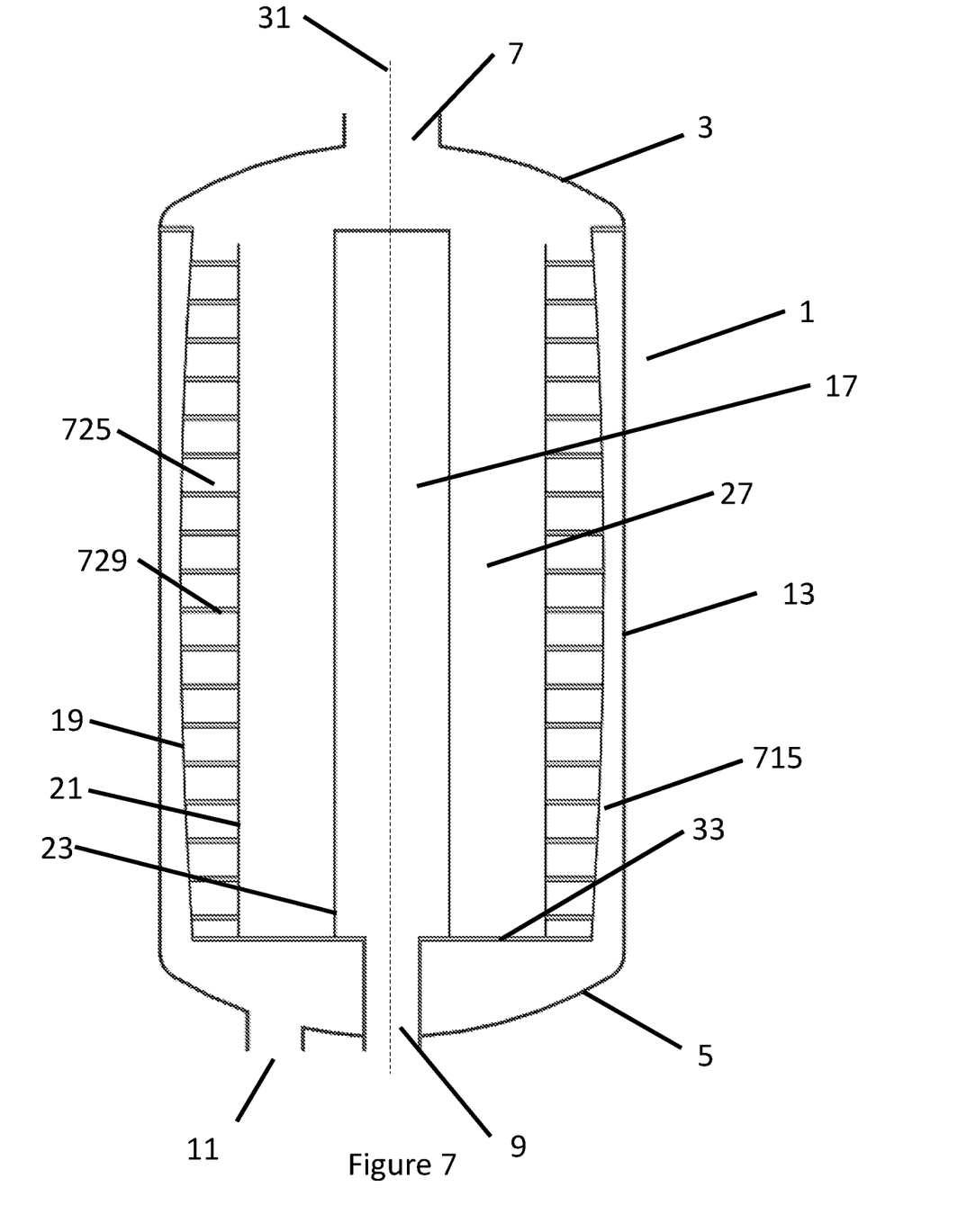
FIG. 7 shows a cross section of a first variant of the first embodiment of the radial adsorption vessel according to the invention in a plane containing the axis of the cylindrical shell.
Figure 8:
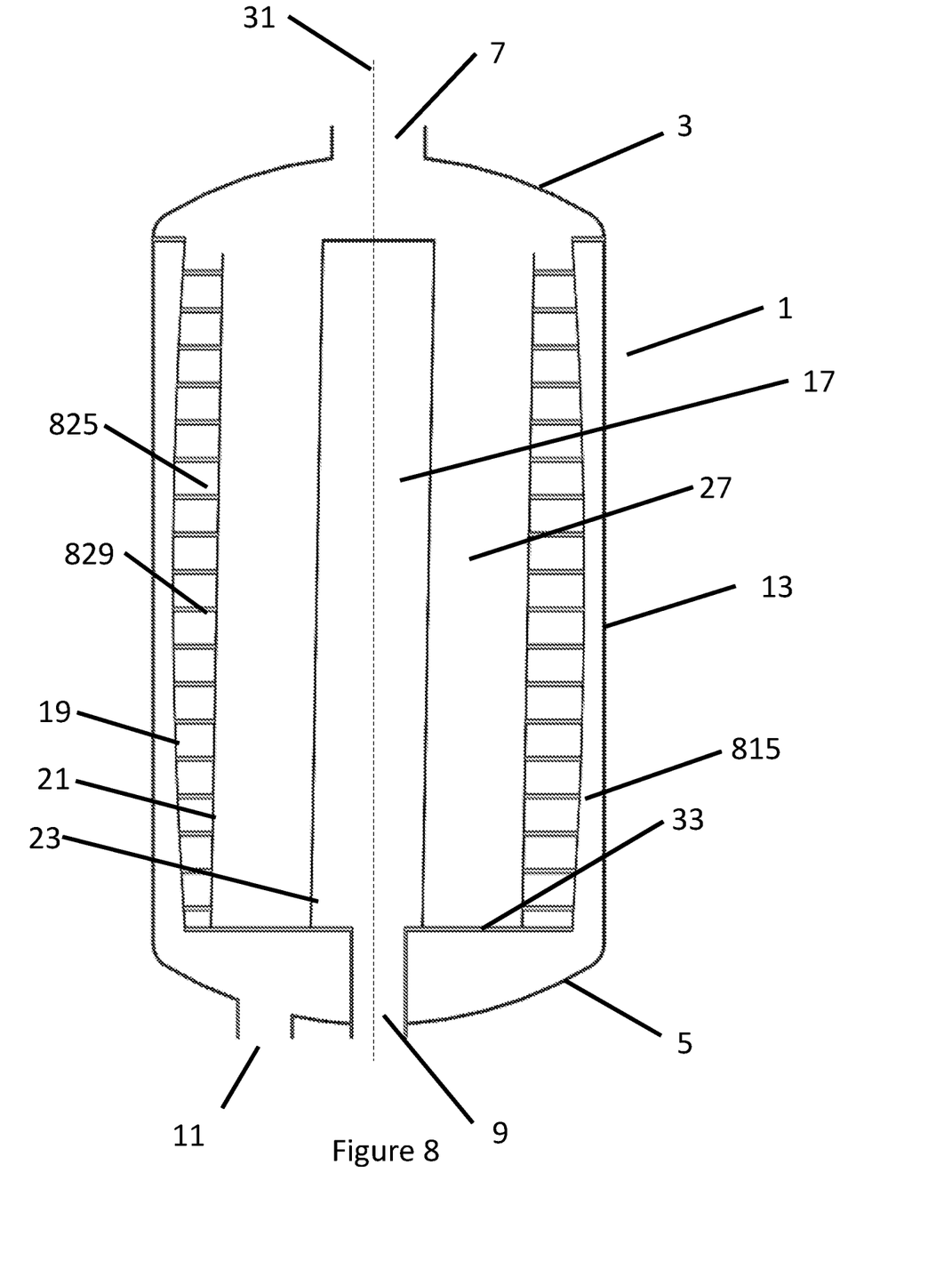
FIG. 8 shows a cross section of a second variant of the first embodiment of the radial adsorption vessel according to the invention in a plane containing the axis of the cylindrical shell.

Vessels of the first embodiment as described above and as shown in ideal form in FIG. 1 having such imperfections are shown in FIGS. 7 and 8. In the vessel shown in FIG. 7 the shape of the outer porous wall 19 deviates from ideal cylindrical form as the radius of the wall is not constant over its whole longitudinal extension. Rather, the radius increases from the top to the about the middle of the vessel and decreases from the middle to the bottom.

In this variant of the vessel in the first embodiment the length of the standoff elements may be adjusted as shown in FIG. 7 so that a uniform distance between intermediate screen 21 and inner porous wall 23 is obtained. Hence, annular segment 27 is controlled to have a uniform depth in fluid flow direction.

Furthermore, in the vessel shown in FIG. 8, in addition to the deviation from cylindrical shape as described for the variant shown in FIG. 7 already, the axis of both inner 19 and outer 23 porous wall axis is tilted with regard to the axis of the shell 13. Also in this variant of the vessel in the first embodiment the length of the standoff elements may be adjusted as shown in FIG. 8 so that again a uniform distance between intermediate screen 21 and inner porous wall 23 is obtained.

As immediately apparent to the skilled person, adjustments such as made in the vessel of the above described first embodiment can be made to other embodiments of the vessel of the invention as needed.

Figure 2:
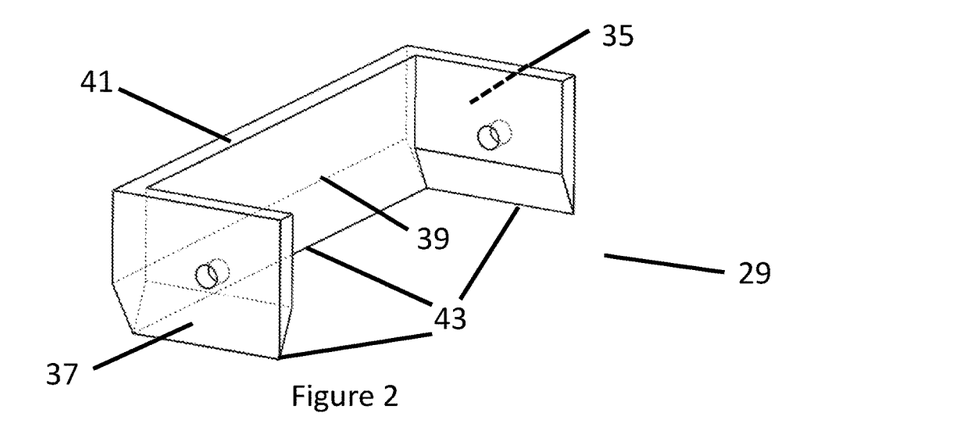
FIG. 2 is a perspective view of an embodiment of a standoff element for use in the present invention.
Figure 3:
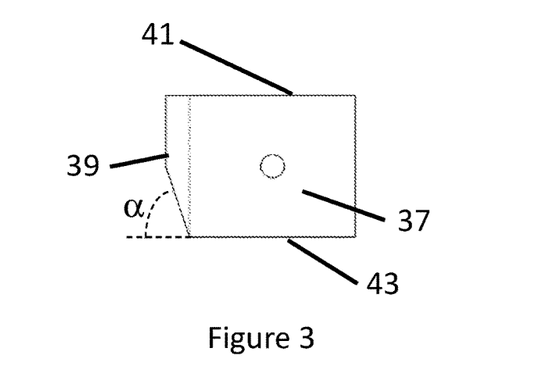
FIG. 3 is a top view onto one end of the standoff element shown in FIG. 2.

One embodiment of the standoff element design applicable to all embodiments of the radial flow adsorbtion vessel as shown in FIGS. 1 and 5 to 10 and as described herein is shown in FIGS. 2 and 3. The standoff elements can be made from extruded aluminum channel, rolled steel channel, formed steel plates or other materials. The choice of material and product form can be made based on metallurgical requirements for a process or to maintain tight tolerance on the distance from a first to a second end of the standoff elements where extruded or rolled products will be more accurate than manually formed or welded products.

Referring to FIG. 2, standoff element 29 includes a first end 35, a second end 37, and a connecting leg 39. The length of the connecting leg 39 is chosen to match the desired spacing of the annular segment in the radial flow vessel. The connecting leg has, in the directions perpendicular to its length, a thickness (width) which is much smaller than its height. Also the thickness (width) of the ends of the standoff element is (much) smaller than its other dimensions, resulting in a top face 41 and bottom face 43 (shown as a sharp edge in the figure), with small width both along the connecting leg and the ends of the element. The top face of the standoff elements faces the top of the vessel, and the bottom face faces its bottom.

Standoff elements are installed with top face 41 perpendicular to the direction of filling with adsorbent particles, which usually coincides with the axis of the vessel 31, so that formation of voids in the adsorbent layer underneath the standoff elements during loading of the adsorbent particles is avoided as far as possible. The first end 35, second end 37 and connecting leg 39 may have constant thickness or they may be provided with tapered edges 43 at the bottom and/or top face. In the embodiment shown in FIGS. 2 and 3 the bottom face is provided with tapered edges 43, which further prevent the formation of voids underneath the standoff elements.

As shown in FIG. 3, the tapering angle is measured from the horizontal, i.e. a plane perpendicular to the axis of the shell. The angle is greater than the angle of repose of the adsorbent material loaded into the radial vessel. By exceeding the angle of repose, the adsorbent will fill in tightly against the standoff element 29 and eliminate formation of any open voids underneath the standoff elements at bottom face 43. Voids can allow flow bypass and local fluidization, which can degrade the adsorbent particles. In another embodiment, tapered edges are provided on both bottom 43 and top face 41 of the standoff element.

When tapered edges 43 are not present, the width of first end 35, second end 37 and connecting leg 39 must be minimized to prevent the formation of voids underneath the standoff elements. In this case, there is a trade-off between the strength and stiffness of the standoff elements and the tendency to form voids.

The standoff elements must have sufficient strength and stiffness to support the weight of the adsorbent bed during loading of adsorbent material without breaking or significantly deforming. The size of ends 35 and 37 are minimized to reduce shadowing effects, wherein flow is locally blocked by the ends. The shape of the standoff elements can be different from the example provided in FIGS. 2 and 3. The key feature is having a fixed leg between two ends of the standoff element. The ends and the leg can, in principle, take any geometric shape.

Figure 4:
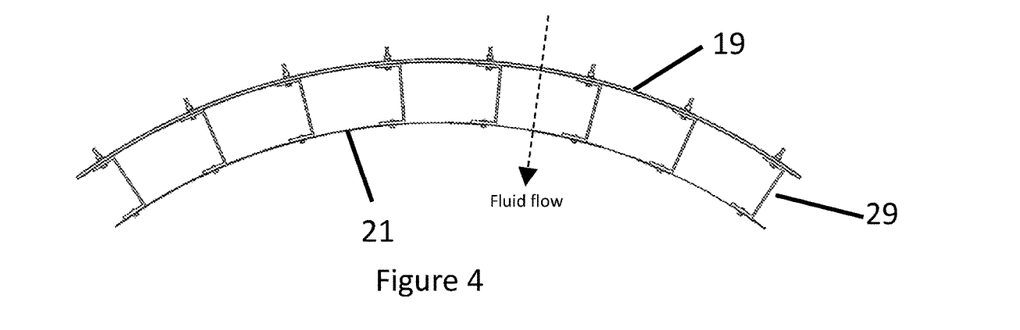
FIG. 4 shows a partial cross-section of a porous wall comprising a perforated metal plate and a screen affixed to the wall by a multitude of standoff elements in a plane perpendicular to the axis of the cylinders formed by the wall/the screen.

Referring to FIG. 4, a plurality of standoff elements 29 are affixed at a first end to a porous wall 19. Each standoff element can be affixed to the porous wall 19 by a weld, adhesive, bolt, or other attachment method. Standoff elements are positioned with top face 41 perpendicular to the porous wall 19 and the connecting leg 39 in radial direction parallel with the fluid flow through the vessel. Intermediate screen 21 is affixed to the second end of each standoff element using a weld, bolt, adhesive or other attachment method. Intermediate screen 21 can be a single flexible wire mesh, woven wire cloth, or expanded metal. Multiple overlapping sheets of any of these materials may also be used. When multiple sheets of mesh are used, the individual sheets may run in the longitudinal, circumferential or other direction that aid in simplifying the installation of the screens. Wire mesh seams and/or overlaps from individual sheets on intermediate screen 21 may be sealed using adhesive or other means of attachment to connect the individual sheets so as to form the complete cylindrical screen.

The number and spacing of the standoff elements are chosen to provide strength and stiffness to the screen. More flexible intermediate screens will require more standoff elements, however, larger and higher numbers of standoff elements increase the overall shadowing effect on the gas flow path.

Standoff elements can use any pitch layout, such as square or triangular.

Figure 5:
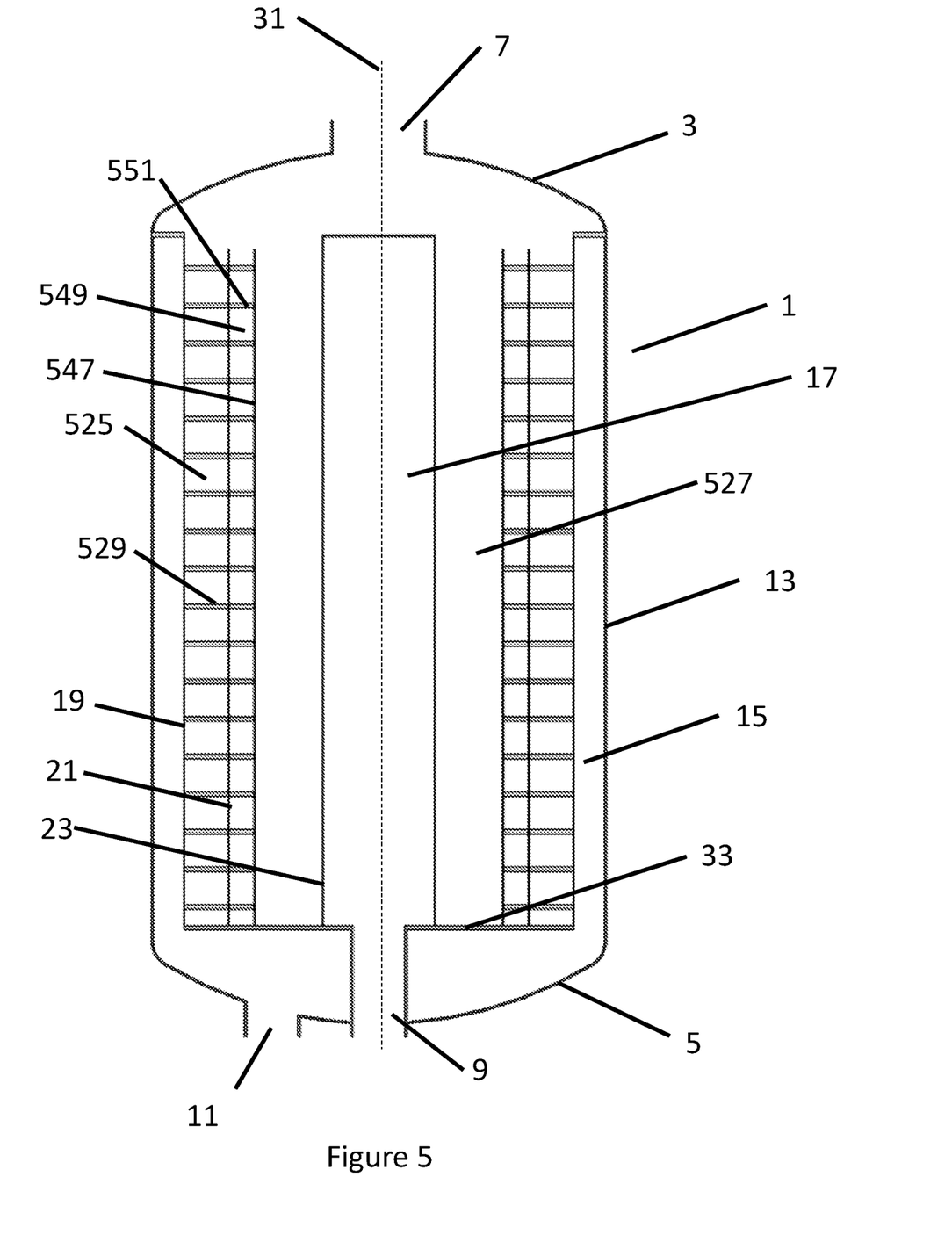
FIG. 5 shows a cross section of a second embodiment of the radial adsorption vessel according to the invention in a plane containing the axis of the cylindrical shell.

A second embodiment of the radial flow adsorption vessel according to the invention is illustrated in FIG. 5. Cylindrical vessel 1 comprises a cylindrical shell 13 with four fluid permeable cylindrical barriers (19, 21, 547, and 23) inside the shell, creating annular segments 525, 549, and 527 that are designated to be filled with adsorbent. The fluid permeable barriers are designed as an outer porous wall 19, an inner porous wall 23 and intermediate screens 21 and 547. The shell, porous walls, and screens are all co-axially arranged around the same axis of symmetry 31.

A first plurality of standoff elements 529 are affixed at a first end to the outer porous wall 19 and at a second end to first intermediate screen 21. The first plurality of standoff elements 529 provide strength and rigidity to first intermediate screen 21. In addition, the standoff elements all have the same length when measured from the first end to the second end creating a uniform distance between outer porous wall 19 and first intermediate screen 21 resulting in a uniform depth of annular segment 525 in fluid flow direction.

A second plurality of standoff elements 551 are affixed at a first end to the first plurality of standoff elements 529, i.e.

each element of the second plurality is affixed to an element of the first plurality with the first intermediate screen held between them, and at a second end to the second intermediate screen 547. The second plurality of standoff elements 551 provide strength and rigidity to second intermediate screen 547. In addition, the standoff elements all have the same length when measured from the first end to the second end creating a uniform distance between first intermediate screen 21 and second intermediate screen 547 which results in a uniform depth of annular segment 549 in fluid flow direction. The size, shape and number of the second plurality of standoff elements can be different from the first plurality of standoff elements.

Intermediate screens 21 and 547 create three annular segments 525, 549, and 527 for filling with adsorbent particles.

The upper end of the first intermediate screen 21 is not connected to the vessel. The lower end of the first intermediate screen near support plate 33 can be free or affixed to support plate 33 by a weld, adhesive, or other method. Similarly, the upper end of the second intermediate screen 547 is not connected to the vessel. The lower end of the second intermediate screen near support plate 33 can be free or affixed to support plate 33 by a weld, adhesive, or other method.

Figure 6:
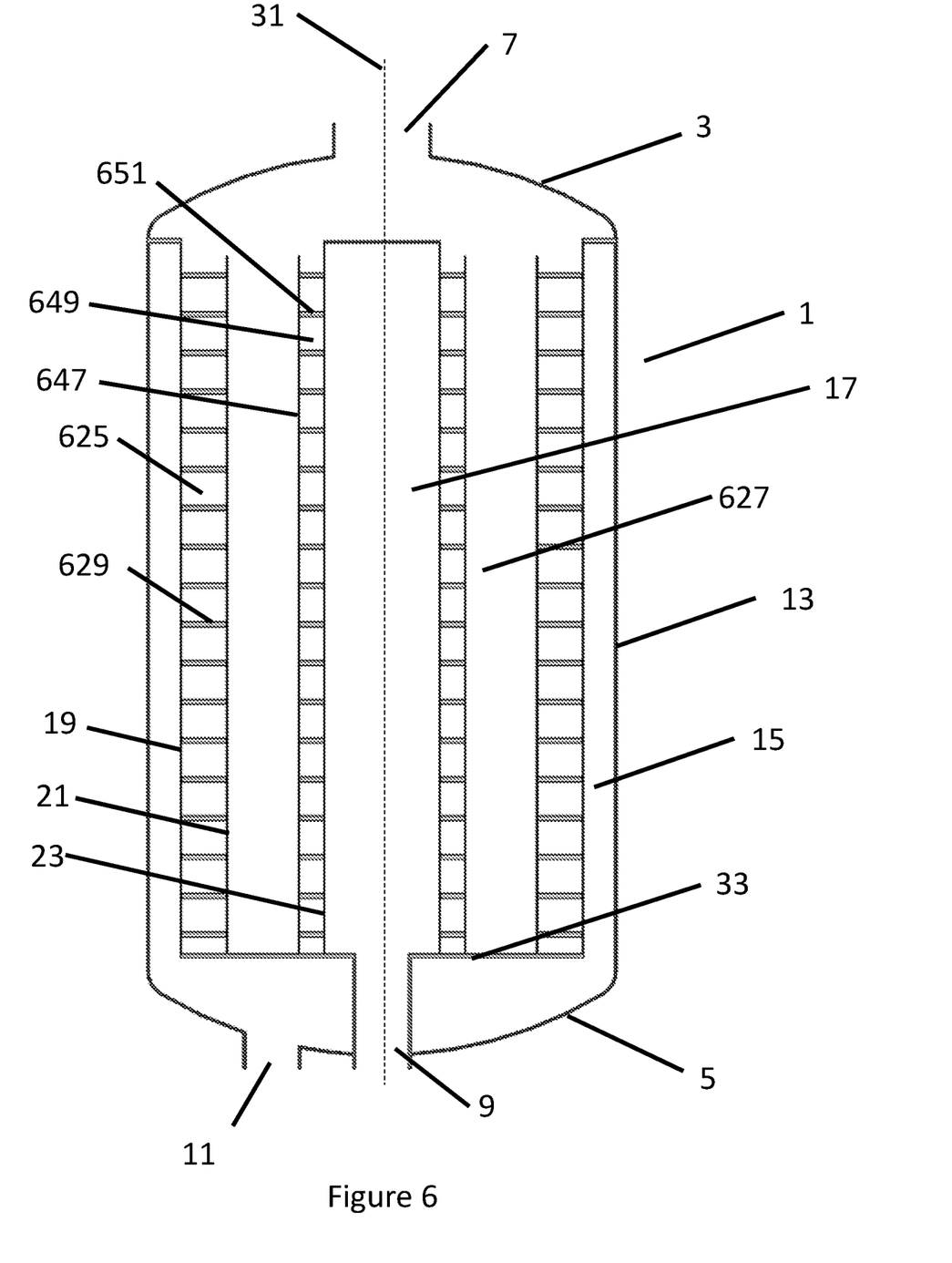
FIG. 6 shows a cross section of a third embodiment of the radial adsorption vessel according to the invention in a plane containing the axis of the cylindrical shell.

A third embodiment of the radial flow adsorption vessel of the invention is illustrated in FIG. 6. Cylindrical vessel 1 comprises a cylindrical shell 13 with four cylindrical fluid permeable barriers (19, 21, 647, and 23) inside the shell creating annular segments 625, 627, and 649 that may be filled with adsorbent. The fluid permeable barriers are designed as an outer porous wall 19, an inner porous wall 23 and intermediate screens 21 and 647. The shell, porous walls, and screens are all co-axially arranged around the same axis of symmetry 31.

A plurality of standoff elements 629 are affixed at a first end to the outer porous wall 19 and at a second end to the first intermediate screen 21. The plurality of standoff elements 629 provide strength and rigidity to first intermediate screen 21. In addition, the standoff elements all have the same length when measured from the first end to the second end creating a uniform distance between outer porous wall 19 and first intermediate screen 21 thus controlling the annular segment 625 to have a uniform depth in fluid flow direction.

A plurality of standoff elements 651 are affixed at a first end to the inner porous wall 23 and at a second end to the second intermediate screen 647. The plurality of standoff elements 651 provide strength and rigidity to second intermediate screen 647. In addition, the standoff elements all have the same length when measured from the first end to the second end creating a uniform distance between inner porous wall 23 and second intermediate screen 647 resulting in annular segment 649 to a have uniform depth in fluid flow direction. Intermediate screens 21 and 647 create three annular segments 25, 27, and 649 which are designated to be filled with adsorbent particles.

The upper end of the first intermediate screen 21 is not connected to the vessel. The lower end of the first intermediate screen near support plate 33 can be free or affixed to support plate 33 by a weld, adhesive, or other method. Similarly, the upper end of the second intermediate screen 647 is not connected to the vessel. The lower end of the second intermediate screen near support plate 33 can be free or affixed to support plate 33 by a weld, adhesive, or other method.

Figure 9:
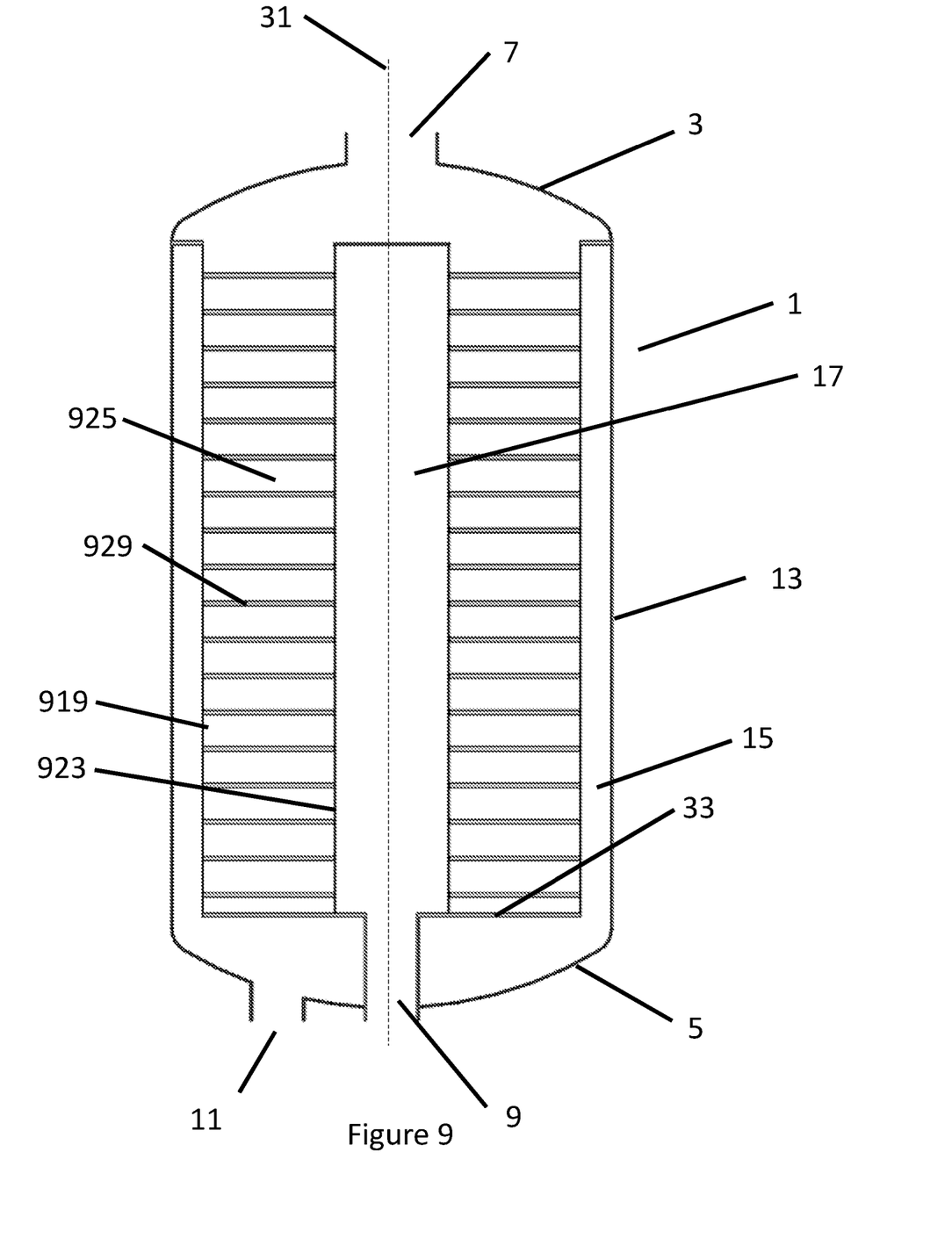
FIG. 9 shows a cross section of a fourth embodiment of the radial adsorption vessel according to the invention in a plane containing the axis of the cylindrical shell.

A fourth embodiment of the radial flow adsorption vessel of the invention is illustrated in FIG. 9. Cylindrical vessel 1 comprises a cylindrical shell 13 with two cylindrical fluid permeable barriers (919 and 923) inside the shell creating annular segment 925 that may be filled with adsorbent. The fluid permeable barriers are designed as an outer porous wall 919 and screen 923. The shell, porous wall, and screen are all co-axially arranged around the same axis of symmetry 31.

A plurality of standoff elements 929 are affixed at a first end to the outer porous wall 919 and at a second end to the screen 923. The plurality of standoff elements 929 provide the necessary strength and rigidity to screen 923 to maintain its cylindrical shape and retain a load of adsorbent within annular segment 925 during filling with the adsorbent and during the adsorption process. Furthermore, screen 923 is used to create the central annulus 17. In this embodiment, the upper end of the screen 923 is closed so as to define the upper end of the central annulus 17. Alternatively, the upper end of screen 923 can be fixed to the top end of the vessel.

In addition, the standoff elements all have the same length when measured from the first end to the second end creating a uniform distance between outer porous wall 919 and screen 923. Hence, annular segment 925 is controlled to have a uniform depth in fluid flow direction.

The screen 923 is affixed to the vessel by a plurality of standoff elements and therefore does not need to be attached to the vessel at its upper and/or lower end. The upper end of the screen 923 is not connected to the vessel. The lower end of the screen near support plate 33 can be free or affixed to support plate 33 by a weld, adhesive, or other method.

Figure 10:
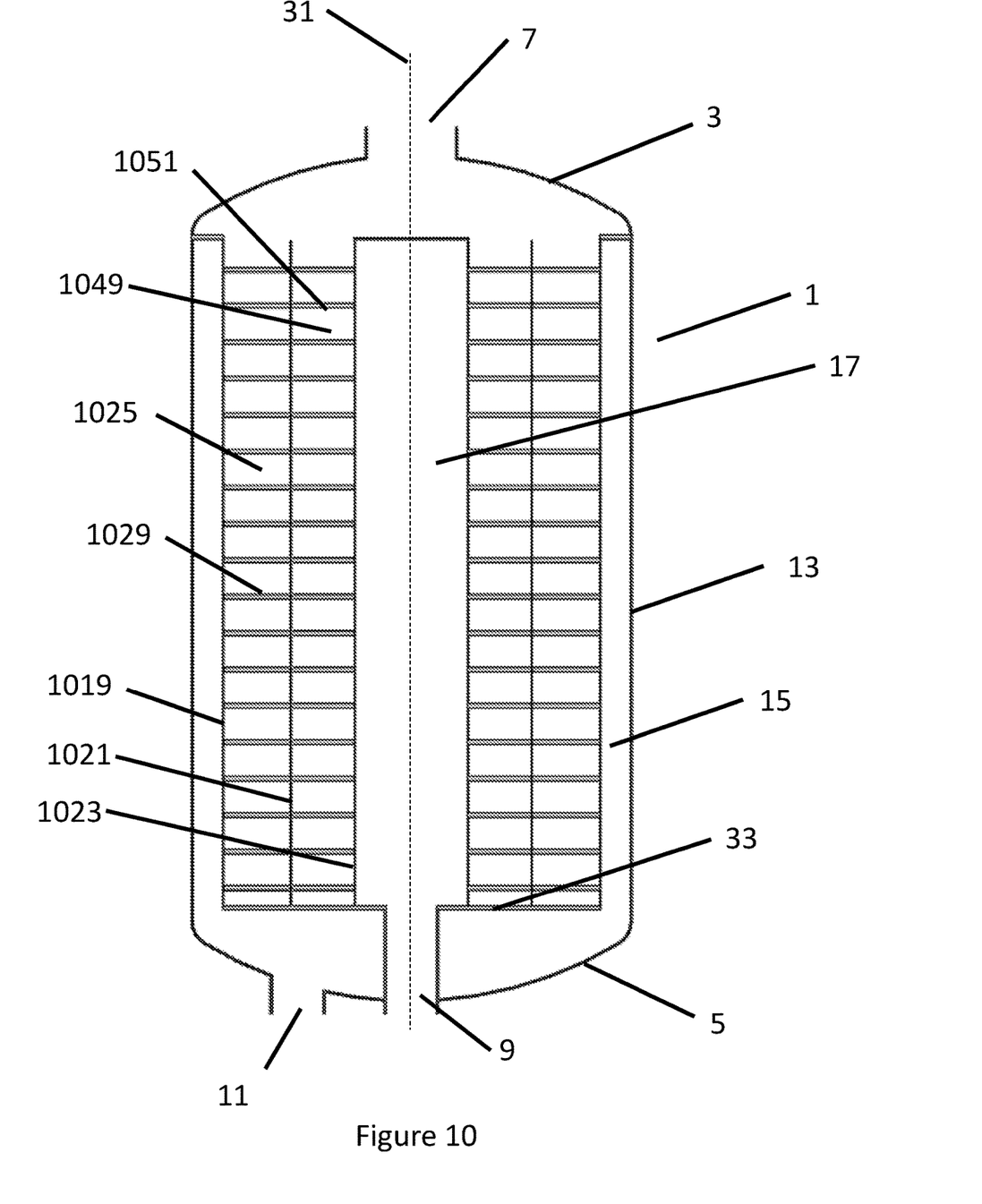
FIG. 10 shows a cross section of a fifth embodiment of the radial adsorption vessel according to the invention in a plane containing the axis of the cylindrical shell.

A fifth embodiment of the radial flow adsorption vessel of the invention is illustrated in FIG. 10. Cylindrical vessel 1 comprises a cylindrical shell 13 with three cylindrical fluid permeable barriers (1019, 1021 and 1023) inside the shell creating annular segments 1029 and 1049 that may be filled with adsorbent. The fluid permeable barriers are designed as an intermediate porous wall 1021 and screens 1019 and 1023. The shell, porous wall, and screens are all co-axially arranged around the same axis of symmetry 31.

A first plurality of standoff elements 1029 are affixed at a first end to the intermediate porous wall 1021 and at a second end to the screen 1019. The plurality of standoff elements 1029 provide the necessary strength and rigidity to screen 1019 to maintain its cylindrical shape and retain a load of adsorbent within annular segment 1025 during filling with the adsorbent and during the adsorption process. Furthermore, screen 1019 is used to create the outer annulus 15.

A second plurality of standoff elements 1051 are affixed at a first end to the intermediate porous wall 1021 and at a second end to the screen 1023. The plurality of standoff elements 1051 provide the necessary strength and rigidity to screen 1023 to maintain its cylindrical shape and retain a load of adsorbent within annular segment 1049 during filling with the adsorbent and during the adsorption process. Furthermore, screen 1023 is used to create the central annulus 17.

In addition, the standoff elements all have the same length when measured from the first end to the second end creating a uniform distance between intermediate porous wall 1021 and screens 1019 and 1023. Hence, annular segments 1029 and 1051 are controlled to have a uniform depths in fluid flow direction.

The screen 1019 is attached to the shell 13 at its upper end and attached to bottom support plate 33 at its lower end. The upper end of the screen 1023 is closed so as to define the upper end of the central annulus 17.

Additional embodiments of the present invention include variations of the previous embodiments as easily apparent for the skilled person. For example, in the first embodiment shown in FIG. 1 the intermediate screen 21 rather than being connected to the outer porous wall 19 by the plurality of standoff elements 29 may be connected to the inner porous wall 23 by a plurality of standoff elements.

In the second embodiment as depicted in FIG. 5 rather than connecting intermediate screen 21 to the outer porous wall 19 by the first plurality of standoff elements 29 intermediate screen 547 may be connected to the inner porous wall 23 by a first plurality of standoff elements.

In the embodiment shown in FIG. 9, an outer porous wall fluid permeable barrier 923 may be designed as an inner porous wall and barrier 919 may be designed as flexible screen, which is then also defining outer annulus 15.

In any of the above embodiments, more than two pluralities of standoff elements can be incorporated into the radial vessel in order to connect screens to either screens or porous walls. For example, an additional plurality of standoff elements supporting a further screen can be used to create an annular segment that remains unfilled by adsorbent. Such an open annular segment can be used to compensate non-uniform distance between porous walls.

EXAMPLE

A radial flow adsorption vessel configured like that shown in FIG. 1 was provided including an outer porous wall with a diameter of 4 m to which standoff elements having a length of 0.20 m on a 0.3 m×0.3 m square grid pattern were affixed, supporting an intermediate screen with a diameter of 3.6 m. The vessel furthermore comprised an inner porous wall with a diameter of 1 m, which was not connected to the outer porous wall or the intermediate screen. The total height, i.e. longitudinal extension, of the porous walls and the screen was 4.5 m. Both porous walls were made from 6 mm thick perforated steel plate with an open area of 45%, overlaid with a wire mesh. Both porous walls had a stiffness of 1000 Nm and the intermediate screen had a stiffness of 1 Nm.

The intermediate screen consisted of a woven wire mesh material that had openings small enough to contain the smallest sieve particles.

The standoff elements were made from steel channel and were welded to the outer porous wall and attached to the intermediate screen with screws.

A small scale rig of screen with standoff elements was built to test strength and rigidity of the standoff concept. The test rig is 4' (10.16 cm) high and 5' (12.7 cm) wide, with the screen rolled to the same radius as the actual product design. The bottom and edges were blocked with aluminum and plywood pieces. A scale was embedded in the stand at the bottom of the screen. The downward pressure on the scale was measured during filling. The curvature of the intermediate screen was measured with a contour gauge before and after filling. The load on the scale reached a constant value after the bed was filled 6-12" (15.24 cm to 30.48 cm) high. This was a very favorable result and the result was presumably improved by the presence of the standoffs and the rough texture of the wire mesh. There was no measurable deformation of the screen (within the accuracy of the gauge, which was about 1/32" (1/12.6 cm).

The invention claimed is:

1. A radial flow adsorption vessel comprising:
a cylindrical outer shell and at least an inner and an outer porous cylindrical wall disposed co-axially inside the shell, wherein inside the shell one or more fluid permeable screens are rigidly connected to at least one of the porous walls by a multitude of separate standoff elements so that the one or more screens has a cylindrical shape co-axial to the shell.

2. Radial flow adsorption vessel according to claim 1 wherein the one or more screens comprises a mesh wire, woven wire cloth or an expanded metal.

3. Radial flow adsorption vessel according to claim 1 wherein the one or more screens comprises a material having a stiffness of less than 35 Nm.

4. Radial flow adsorption vessel according to claim 2 wherein the one or more screens comprises a material having a stiffness of less than 35 Nm.

5. Radial flow adsorption vessel according to claim 1 wherein the standoff elements are mounted so that they have their smallest extension in the plane perpendicular to a filling direction of the adsorbent particles.

6. Radial flow adsorption vessel according to claim 1 wherein the edges of the standoff elements pointing in a filling direction of the adsorbent particles are tapered.

7. Radial flow adsorption vessel according to claim 1 wherein the separate standoff elements are disposed in a grid along the longitudinal and circumferential directions of the cylinder formed by the screen.

8. Radial flow adsorption vessel according to claim 1 wherein the lengths of the individual standoff elements are selected so that a uniform radial distance between a first screen and at least one adjacent screen or porous wall is obtained.

9. Radial flow adsorption vessel according to claim 1 wherein the standoff elements are disposed equidistantly to each other in longitudinal direction and/or in circumferential direction.

10. Radial flow adsorption vessel according to claim 1 wherein an outermost and an innermost annular segment defined in the vessel form channels for fluid flow to and from the vessel.

11. Radial flow adsorption vessel according to claim 1 wherein at least one annular segment defined in the vessel is filled with adsorbent particles.

12. Radial flow adsorption vessel according to claim 1 wherein a support plate is provided at the bottom of the shell to which the bottom end(s) of porous wall(s) and the one or more screens are rigidly connected.

13. Radial flow adsorption vessel according to claim 1 wherein one or more of the fluid permeable screens is free-standing at the top or wherein one or more of the fluid permeable screens is fixed to the top of the vessel.

14. An adsorption process wherein a radial flow adsorption vessel according to claim 1 is used.

15. Adsorption process according to claim 14 wherein the process is a pressure and/or vacuum swing adsorption process.

16. A radial flow adsorption vessel comprising: a cylindrical outer shell and at least one cylindrical porous wall disposed co-axially inside the shell, wherein inside the shell one or more fluid permeable screens are rigidly connected to the at least one porous wall by a multitude of separate standoff elements so that the one or more screens has a cylindrical shape co-axial to the shell and wherein the one or more screens comprises a mesh wire, woven wire cloth or an expanded metal.

17. Radial flow adsorption vessel according to claim 16, wherein the one or more screens comprises a material having a stiffness of less than 35 Nm.

18. A radial flow adsorption vessel comprising: a cylindrical outer shell and at least one cylindrical porous wall disposed co-axially inside the shell, wherein inside the shell one or more fluid permeable screens are rigidly connected to the at least one porous wall by a multitude of separate standoff elements so that the one or more screens has a cylindrical shape co-axial to the shell, and wherein the one or more screens comprises a material having a stiffness of less than 35 Nm.

19. Radial flow adsorption vessel according to claim 18 wherein the standoff elements are mounted so that they have their smallest extension in the plane perpendicular to a filling direction of the adsorbent particles.

20. Radial flow adsorption vessel according to claim 18 wherein an outermost and an innermost annular segment defined in the vessel form channels for fluid flow to and from the vessel.

* * * * *